No. 12,636. REISSUED APR. 23, 1907.
J. W. MEIXELL.
WHEEL.
APPLICATION FILED FEB. 15, 1907.
Fig. 1.
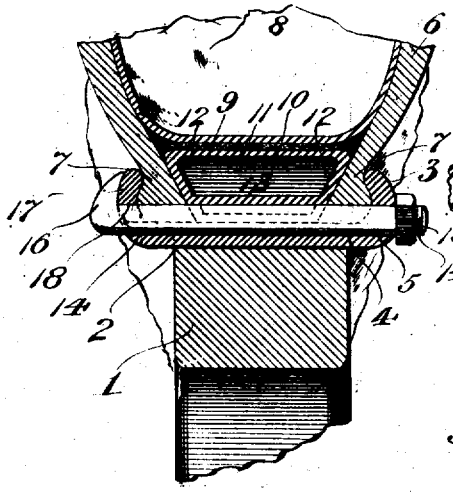
Fig. 3.
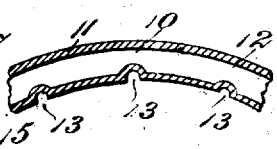
Fig. 2.
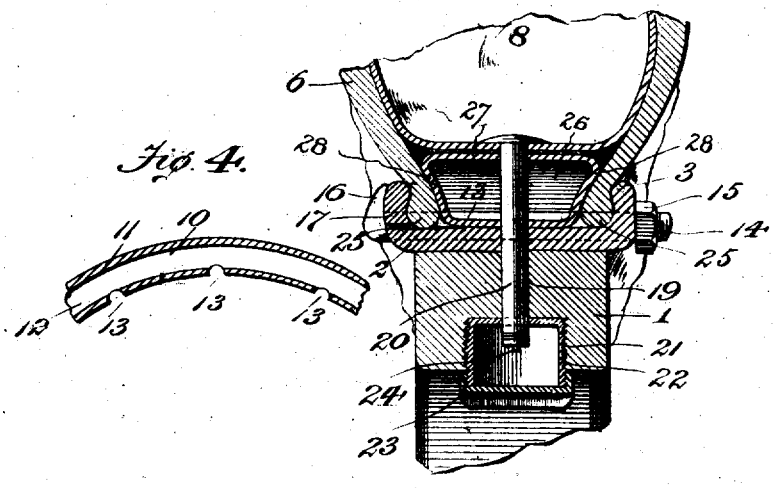
Fig. 4.
Witnesses:
C. F. Burell
H. S. Beall
Inventor:
John W. Meixell,
by W. J. Duvall
Attorney.

UNITED STATES PATENT OFFICE.

JOHN W. MEIXELL, OF LEWISBURG, PENNSYLVANIA.

WHEEL.

No. 12,636. Specification of Reissued Letters Patent. Reissued April 23, 1907.

Original No. 826,865, dated July 24, 1906. Application for reissue filed February 15, 1907. Serial No. 357,597.

*To all whom it may concern:*

Be it known that I, JOHN W. MEIXELL, a citizen of the United States, residing at Lewisburg, in the county of Union and State of Pennsylvania, have invented certain new and useful Improvements in Wheels, of which the following is a specification.

This invention relates to improvements in that class of wheels mainly employed in automobile construction and embracing a pneumatic tire of the "clencher" and the well known Dunlop forms or styles.

The objects and advantages of the invention will hereinafter appear, and the novel features will be particularly pointed out in the claims.

Referring to the drawings, Figure 1 is a transverse sectional view through a portion of a wheel embodying my invention, the same being shown in connection with a "clencher-style" tire. Fig. 2 is a similar view showing the invention in connection with a Dunlop style of tire. Fig. 3 is a longitudinal sectional view of the removable internal tubular band employed in Fig. 1. Fig. 4 is a similar view of the same slightly modified, and embodied in Fig. 2.

Similar numerals of reference indicate similar parts in all the figures of the drawings.

My invention relates to that particular class of wheels embracing pneumatic tires wherein the latter is of the well known clencher or Dunlop styles or types, and wherein is employed a mechanical contrivance for securing and releasing the tires to and from the rim by means of side clamps which engage the external beads of the casing.

As will hereinafter appear, I provide by my invention a simple and secure means for securely clamping the tire upon the rim, the said means being so constructed as to permit of ready removal for repair or other purposes, and also a convenient support for the inner tube, should the latter be used, which support is arranged beyond or outside of the clamping means, whereby, as will be obvious, the inner tube is prevented from coming in contact with the rim of the wheel, and the outer casing of the tire is prevented from becoming rim-cut or worn, even though the tire should become entirely deflated.

1 designates the usual wood felly, upon which is mounted the flat rim 2, the edges of which project beyond the sides of the felly. One edge of the rim is upturned and inwardly disposed, as at 3, to form one member of a clamp, and at intervals the outer face of the rim may be channeled transversely, as at 4, the channels extending entirely across the rim and through the upturned clamping member 3, as indicated at 5.

6 designates the outer casing, which is of usual construction, and in Fig. 1 is therefore provided along its outer inner edges with the beads 7, designed to be engaged by the clamp 3 at one side and by a companion removable clamping-ring at the other side, which ring will be hereinafter described.

I may or may not employ the inner tube 8, which is of the usual construction and which may or may not be reinforced along its inner wall with an external layer of fabric 9.

10 designates an annular clamping-ring, which may or may not be tubular and formed of wood, metal, rubber, or any material desired, but is herein shown of metallic tubular construction. This ring is preferably somewhat wedge-shaped, or substantially so, and comprises as essentials an outer flat base 11 and opposite sides 12, the latter converging toward the inner circumference of the ring and conforming to the internal converging walls of the casing 6, for which purpose said walls may be plain or concaved. The ring rests at its inner circumference upon the rim 2, and at intervals agreeing with the channels 4 may be provided with half-round transverse channels 13. The channels 13 may be closed, as shown in Fig. 3—that is to say, may be formed by pressing the internal wall of the ring 10 inward—or they may be cut through the side and bottom walls of the ring, as shown in Fig. 4. However the channels may be formed they are intended to combine with the channels 4 of the rim to produce transverse holes for the bolts 14, it being also understood that the beads of the tire casing 6 are provided with corresponding openings. The bolts 14 are threaded at one end, so as to accommodate nuts 15, and at their opposite ends are provided with heads 16, the latter being disposed at one side only of the axial centers of the bolts. The remaining bead 7 of the tire-casing 6 is clamped by the before-mentioned clamping-ring 17, which corresponds with the stationary clamp 3, and, like the latter, may have notches 18 along its inner edge to aid in producing the bolt-holes. The heads 16 of the bolts engage the clamping-ring, and when the nuts are tightened up upon the bolts the two beads are not only clamped securely in position by the action of the clamping-ring 17, but by the presence of the bolts and the aforesaid notches in the base of the casing the latter is prevented from having any annular movement or creeping.

It will be seen that as the opposite bases or sides of the casing are forced laterally they are firmly pressed against the opposite inclined walls of the internal ring, so that each bead is separately clamped and held in position by an unyielding means, as well as clamped or drawn laterally toward each other. By this means, as will be obvious, it is impossible for the tire-casing to become loosened or detached. Furthermore, by forming the close joints between the inclined walls of the inner ring and inner walls of the tire-casing the tire is rendered air-tight, and the necessity of an inner tube is obviated. More especially is this true where the bolts 14 are located close together or at more frequent intervals than is usually the case. It will be seen, furthermore, that the flat outer base of the internal ring serves as an excellent support for the inner tube 8, should the same be used, and avoids any likelihood of it becoming pinched either during use or in applying or removing the tire. A further advantage resides in the fact that the flat outer base of the internal ring extends beyond the tire-clamping means—namely, the flange 3 and ring 17—and, as will be obvious, should the tire become wholly or partly deflated, as in case of a puncture or other leak, it will be supported in a manner by the internal ring, and thus prevented from chafing against the flange 3 and ring 17, and becoming what is known as "rim-cut." As a matter of fact, the tire may be used in a deflated form without danger of material injury.

In order to compensate for the obvious necessity and disadvantage of employing a valve-stem of sufficient length to extend entirely through the ring 10, rim 2, and felly 1, I provide the felly with the usual cylindrical passage 19 (see Fig. 2) for the valve-stem 20, and form at the bottom of said passage an enlarged opening or chamber 21, extending a desired distance from the inner side of the felly. The valve-stem 20 would then be made sufficiently short so that the outer end thereof would merely enter the chamber 21. In said chamber I prefer to insert a bushing 22, the same being preferably threaded into the chamber, and to thread onto said bushing a removable hollow cap 23, into which the cap 24 of the valve might enter. By this means, as before stated, I am enabled to avoid using a long valve-stem, and the means described will be found not to materially weaken the felly, inasmuch as the loss of wood therein is amply compensated for by the provision of the bushing 22 and its cap 23. It will be obvious, however, that the bushing and cap are not absolutely essential, in that the principal object of the chamber or cavity 21 is to permit of the use of a short valve-stem.

Fellies of different manufacture vary in thickness, and at present it is customary in the manufacture of tires to make the valve-stems of a length to pass entirely through the thickest felly. In the present instance by providing a chamber at the inner side of the felly a short valve-stem may be used and the depth of the cavity may vary with the thickness of the felly. The use of a short valve-stem is advantageous in many respects; for instance it permits of the tire being applied and removed with greater ease and facility than is possible with a long valve-stem. Furthermore, the short valve-stem terminating within the chamber or cavity is protected against injury, and of course this protection is increased when the cap is employed.

As before suggested, my invention is equally applicable with but very slight modification to the Dunlop style of tire. I have amply illustrated this in Fig. 2 of the drawings, to which attention is now directed. As will be seen, the Dunlop construction differs from that of the clencher, among other things, in the base of its outer casing, the said base in the Dunlop construction being formed with annular beads wired to retain them in shape. Such beads, which I have indicated as 25, are curved on their inner as well as their outer faces, so that they present two coverging curved internal walls. This of course necessitates a change of disposition in the internal ring 26, which, though still of substantially wedge-shape in cross-section yet consists of the flat outer base 27 and inclined converging side walls 28, slightly concaved, so as to conform to the outer walls of the tire. Otherwise the construction is the same as heretofore described, and so, too, is the operation.

Having described my invention what I claim is:—

1. The combination, of a felly, laterally-adjustable tire-clamping means carried thereby and comprising a fixed wall, a removable outer ring, an internal ring, and bolts passing through said wall and rings, and a tire having its edges clamped between said wall and internal ring and between said internal ring and removable ring.

2. The combination, of a felly, laterally-adjustable tire-clamping means carried thereby and comprising a fixed wall, a removable outer ring, an internal ring, and bolts passing through said wall and rings, and a tire having its edges clamped between the fixed wall and internal ring and between the internal ring and the removable ring and provided with opposite transverse notches engaged by said bolts.

3. The combination, of a felly, adjustable tire-clamping means carried thereby and comprising a fixed wall, an opposite removable ring, and bolts engaging the two, a tire having its edges engaged by said means, and an annular internal ring mounted upon and supported by the felly and substantially wedge-shape in cross-section and having its outer wall or base beyond the annular plane of the tire-clamping means, whereby it is adapted to support the tire, when deflated, beyond said clamping means, said bolts engaging said wedge-shaped ring.

4. The combination, of a felly, a rim mounted thereon and provided with laterally-adjustable tire-clamping means comprising a fixed wall, a removable ring and transverse bolts connecting the two, a tire mounted on the rim and having its edges engaged by said means, an internal removable annular ring provided with transverse recesses, and transversely-disposed devices carried by the rim and engaging the said recesses.

5. The combination, of a felly, a rim mounted thereon and provided with laterally-adjustable tire-clamping means comprising a fixed wall, a removable ring and transverse bolts connecting the two, a tire mounted on the rim and having its edges engaged by said means, an internal annular ring disposed between the edges of the tire and mounted upon and supported by the rim and provided along its inner circumference with transverse recesses, and transverse projections carried by the rim and engaging said recesses.

6. The combination, of a felly, a flat rim mounted thereon and extending beyond the edges thereof and upturned at one edge to produce a clamping member, a removable notched ring at the opposite side of the rim, said upturned edge and ring being adapted to fit over the edges of a tire, clamping-bolts extending through the upturned edge and ring and terminating in heads adapted to engage the latter, a tire mounted on the rim, and an internal annular ring of substantially wedge-shape in cross-section mounted on the rim and conforming at its sides to the tire and provided with bolt-receiving openings alining with those in the upturned edge of the rim and the ring.

7. The combination, of a felly, a flat metallic rim mounted thereon and extending beyond the sides thereof, said rim having one edge flanged to form a clamp member, a removable ring corresponding and shaped similar to the flange located at the opposite side of the rim, said flange and ring having transverse bolt-receiving openings, bolts mounted in the openings and provided at their ends with nuts and heads, the latter engaging the ring, a tire mounted on the rim and grooved to receive the bolts and having its edges engaged by the ring and flange, and an internal ring wedge-shaped in cross-section and mounted upon and supported by the rim and provided with openings to receive the bolts, said internal ring comprising opposite inclined walls against which the opposite sides of the tire are forced and clamped by means of the flange and ring.

8. The combination, of a felly, a rim mounted thereon and having one of its edges bent to form a flange and provided with bolt-holes, a similarly-shaped ring at the opposite side of the rim and provided with corresponding bolt-openings, headed bolts arranged in said bolt-openings of the ring and flange and engaging the former, a tire resting on the rim and having its edges engaged by the ring and flange, and an internal removable ring resting upon and supported by the rim and substantially wedge-shaped in cross-section, said ring being provided with recesses or channels to receive the bolts and having its sides of a contour agreeing with the sides of the tire.

9. The combination, of a felly, a rim thereon, a tire arranged on the latter and having opposite beads, means embodying transverse bolts carried by the rim for engaging the beads and clamping the tire, an internal hollow ring wedge-shaped in cross-section and interposed between the inner edges of the tire and conforming thereto and resting upon and supported by the rim and engaged by said bolts, and an inner tube resting upon and supported by said internal ring.

10. The combination, of a felly, a rim, a tire thereon, and clamping means carried by the rim and embodying transverse connecting-bolts, and an internal tube-like ring wedge shape in cross-section and arranged upon and supported by the rim and having its outer wall or base beyond the said clamping means, said ring being engaged by said bolts.

11. The combination, of a felly, a rim, a clamping means carried thereby, a tire having its edges engaged by the clamping means, a wedge-shaped tube-like ring mounted upon and supported by the rim and provided at intervals along its inner circumference with channels, and clamping-bolts mounted in the channels and engaging the clamping means.

12. The combination, of a pneumatic tire, a felly provided with a valve-stem opening terminating in an enlarged chamber, an internal annular ring having an opening agreeing with the valve-stem opening in the felly, a double-tube tire, the inner tube of which rests upon and is supported by said internal ring, clamping means for securing the edges of the outer casing of the tire, and a valve-stem carried by the inner tube and extending through the openings in the internal ring and the felly.

13. The combination, of a pneumatic tire, a felly provided with a valve-stem opening terminating in an enlarged chamber, an internal annular ring having an opening agreeing with the valve-stem opening in the felly, a tire mounted on the felly, tire-securing means, and a valve-stem extending through the openings in the internal ring and felly.

14. The combination, of a pneumatic tire comprising a valve-stem, a felly having an opening for the stem which opening terminates in an enlarged cavity, a bushing located within the cavity and extending beyond the felly, and a cap threaded on the bushing.

15. The combination, of a felly, a flat rim, a tire thereon, a tire-clamping means arranged outside of and free to slide over the rim to exert a lateral compression upon the tire, and an internal ring removably mounted upon the flat rim and free to move laterally thereover, the opposite sides of said ring constituting the inner members of said tire clamping means.

16. The combination, of a felly, a flat rim, a tire thereon, a tire clamping means arranged outside of and free to slide over the rim to exert a lateral compression upon the tire, and an internal ring removably mounted upon the flat rim and free to move laterally thereover, the opposite sides of said ring constituting the inner members of said tire clamping means and of a shape or contour agreeing with the inner surfaces of the clamped edges of the tire.

17. The combination, of a felly, a flat rim, a tire thereon, a tire clamping means arranged outside of and free to slide over the rim to exert a lateral compression upon the tire, and an internal tubular or hollow ring removably mounted upon the flat rim and free to move laterally thereover, the opposite sides of said ring constituting the inner members of said tire-clamping means.

18. The combination, of a felly, a flat rim having one edge outwardly bent to form one member of a tire clamping means, a tire arranged against such member, a ring removably mounted within the tire and upon the rim and free to slide laterally thereon, a tire-clamping ring of greater diameter than and mounted on the rim at that edge opposite the outwardly-bent edge thereof and free to slide laterally over the rim toward said edge, and means carried by the rim for laterally drawing the tire-clamping ring toward the outwardly-bent edge of the rim.

19. The combination, of a pneumatic tire having a short valve-stem, and a felly provided with an opening for the valve-stem and with an enlarged chamber or cavity at the outer end of said opening and in which chamber or cavity the outer end of the valve-stem lies.

20. The combination, of a pneumatic tire having a short valve-stem, a felly provided with an opening for the valve-stem and with an enlarged chamber or cavity at the outer end of said opening, and a closure for said chamber or cavity.

21. The combination, of a pneumatic tire having a short valve-stem, a felly provided with an opening for the valve-stem and with an enlarged chamber or cavity at the outer end of said opening, a bushing within said cavity, and a closure at the outer end of the cavity.

22. The combination, of a pneumatic tire having a short valve-stem, a felly provided with an opening for the valve-stem and with a chamber or cavity at the outer end of said opening in which the outer end of the valve-stem lies, a bushing within the cavity, and a closure for the cavity engaging the outer end of the bushing.

In testimony whereof I have signed my name to this specification, in the presence of two subscribing witnesses.

J. W. MEIXELL.

Witnesses:

HANNAH M. LONG,
PHILIP B. LINN.